(12) United States Patent
Salter et al.

(10) Patent No.: US 9,616,823 B1
(45) Date of Patent: Apr. 11, 2017

(54) ILLUMINATED BADGE FOR A VEHICLE

(71) Applicant: Ford Global Technologies, LLC, Dearborn, MI (US)

(72) Inventors: Stuart C. Salter, White Lake, MI (US); Paul Kenneth Dellock, Northville, MI (US); Michael A. Musleh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/243,224

(22) Filed: Aug. 22, 2016

(51) Int. Cl.
| | |
|---|---|
| *F21S 8/10* | (2006.01) |
| *F21V 21/00* | (2006.01) |
| *B60R 13/00* | (2006.01) |
| *F21V 3/00* | (2015.01) |
| *F21V 8/00* | (2006.01) |
| *F21W 101/02* | (2006.01) |
| *F21Y 115/10* | (2016.01) |

(52) U.S. Cl.
CPC .............. *B60R 13/005* (2013.01); *F21V 3/00* (2013.01); *G02B 6/0068* (2013.01); *F21W 2101/02* (2013.01); *F21Y 2115/10* (2016.08)

(58) Field of Classification Search
CPC .. B60Q 1/0011; B60Q 1/0088; B60Q 1/2619; B60Q 1/50; B60Q 3/0293; B60R 13/05; F21S 10/023; F21V 3/00; G02B 6/0068; G09F 13/04; G09F 21/04; G09F 21/048; H05B 37/0281
USPC ......................... 362/487, 496, 509–510, 545
See application file for complete search history.

(56) References Cited

U.S. PATENT DOCUMENTS

| | | | |
|---|---|---|---|
| 5,709,453 | A | 1/1998 | Krent et al. |
| 6,031,511 | A | 2/2000 | DeLuca et al. |
| 6,117,362 | A | 9/2000 | Yen et al. |
| 6,494,490 | B1 | 12/2002 | Trantoul |
| 6,577,073 | B2 | 6/2003 | Shimizu et al. |
| 6,729,738 | B2 | 5/2004 | Thompson et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller et al. |

(Continued)

FOREIGN PATENT DOCUMENTS

| | | |
|---|---|---|
| CN | 2872404 Y | 2/2007 |
| CN | 101337492 A | 1/2009 |

(Continued)

OTHER PUBLICATIONS

WhiteOptics, WhiteOptics Micro-Diffusion Film, web page, 2014, Frankfurt, Germany.

*Primary Examiner* — Jason Moon Han
(74) *Attorney, Agent, or Firm* — Jason C. Rogers; Price Heneveld LLP

(57) ABSTRACT

A badge is provided herein. The badge includes a housing defining a viewable portion having indicia. A first set of light sources is configured to emit light toward the viewable portion. A light guide extends between the viewable portion and the first set of light sources. A decorative layer and a diffusive layer are disposed between an upper surface of the light guide and viewable portion. A second set of light sources is configured to emit light toward the viewable portion. The first set of light sources illuminates a first region of the viewable portion and the second set of light sources illuminates a second region of the viewable portion.

18 Claims, 6 Drawing Sheets

(56) References Cited

U.S. PATENT DOCUMENTS

| | | |
|---|---|---|
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0194080 A1 | 8/2010 | Paxton et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0243203 A1 | 9/2012 | Koike et al. |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 101344230 A | 1/2009 |
| CN | 201169230 Y | 2/2009 |
| CN | 201193011 Y | 2/2009 |
| CN | 101559741 A | 10/2009 |
| CN | 104742821 A | 7/2015 |
| DE | 29708699 U1 | 7/1997 |
| DE | 10319396 A1 | 11/2004 |
| EP | 1793261 A1 | 6/2007 |
| EP | 2103972 A1 | 9/2009 |
| EP | 2778209 A1 | 9/2014 |
| JP | 2000159011 A | 6/2000 |
| JP | 2007238063 A | 9/2007 |
| JP | 5095029 B1 | 12/2012 |
| WO | 2006047306 A1 | 5/2006 |
| WO | 2014068440 A1 | 5/2014 |

ILLUMINATED BADGE FOR A VEHICLE

FIELD OF THE INVENTION

The present disclosure generally relates to vehicle lighting systems, and more particularly, to an illuminated badge employing one or more light sources therein.

BACKGROUND OF THE INVENTION

Illumination arising from the use of a plurality of light sources offers a unique and attractive viewing experience. It is therefore desired to implement such structures in automotive vehicles for various lighting applications.

SUMMARY OF THE INVENTION

According to one aspect of the present invention, a badge is disclosed. The badge includes a housing defining a viewable portion having indicia. A first set of light sources is configured to emit light toward the viewable portion. A light guide extends between the viewable portion and the first set of light sources. A decorative layer and a diffusive layer are disposed between an upper surface of the light guide and viewable portion. A second set of light sources is configured to emit light toward the viewable portion. The first set of light sources illuminates a first region of the viewable portion and the second set of light sources illuminates a second region of the viewable portion.

According to another aspect of the present invention, a badge for a vehicle is disclosed. The badge includes a housing having a viewable portion. A first light source is configured to illuminate a first portion of the viewable portion. A light guide is disposed between the first light source and the viewable portion. A diffusive layer and a decorative layer are disposed between the light guide and the viewable portion.

According to yet another aspect of the present invention, a method of forming a badge is disclosed. The method includes forming a housing. Next, a light source is disposed within the housing. The light source is configured to direct light towards a viewable portion. Next, a light guide is disposed between the light source and viewable portion. An indicia layer is formed that defines one or more indicia by adhering a diffusive layer to a decorative layer. The indicia layer is disposed between the viewable portion and light guide.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
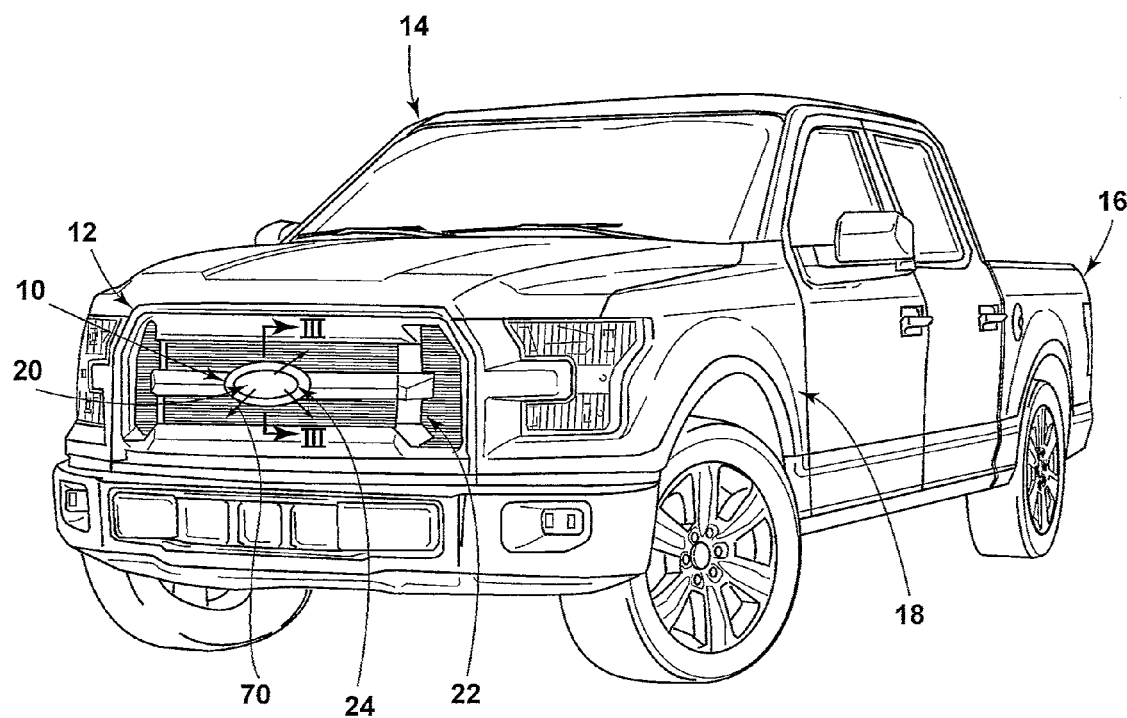
FIG. 1 is a front perspective view of a badge mounted to a front portion of a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated badge for a vehicle. The badge may advantageously employ one or more light sources configured to illuminate at pre-defined frequencies. The badge may further include a light guide configured to direct light emitted from one or more light sources through a viewable portion of the badge.

Referring to FIG. 1, a badge 10 is generally shown mounted on a front portion 12 of a vehicle 14. In other embodiments, the badge 10 may be located elsewhere, such as, but not limited to, a rear portion 16, or a side(s) 18 of the vehicle 14. The badge 10 may be configured as an insignia that is presented as an identifying mark of a vehicle manufacturer and includes a viewable portion 20 that is generally prominently displayed on the vehicle 14. In the presently illustrated embodiment, the badge 10 is centrally located on a grille assembly 22, thus allowing the badge 10 to be readily viewed by an observer looking head on at the vehicle 14. As will be described below in greater detail, one or more light sources 24 within the badge 10 may emit light 70 through the viewable portion 20 to provide a distinct styling element to the vehicle 14. In some embodiments, the one or more light sources 24 may be disposed in one or more sets 38, 42 (FIG. 2) to create a wide variety of illumination patterns.

Figure 2:
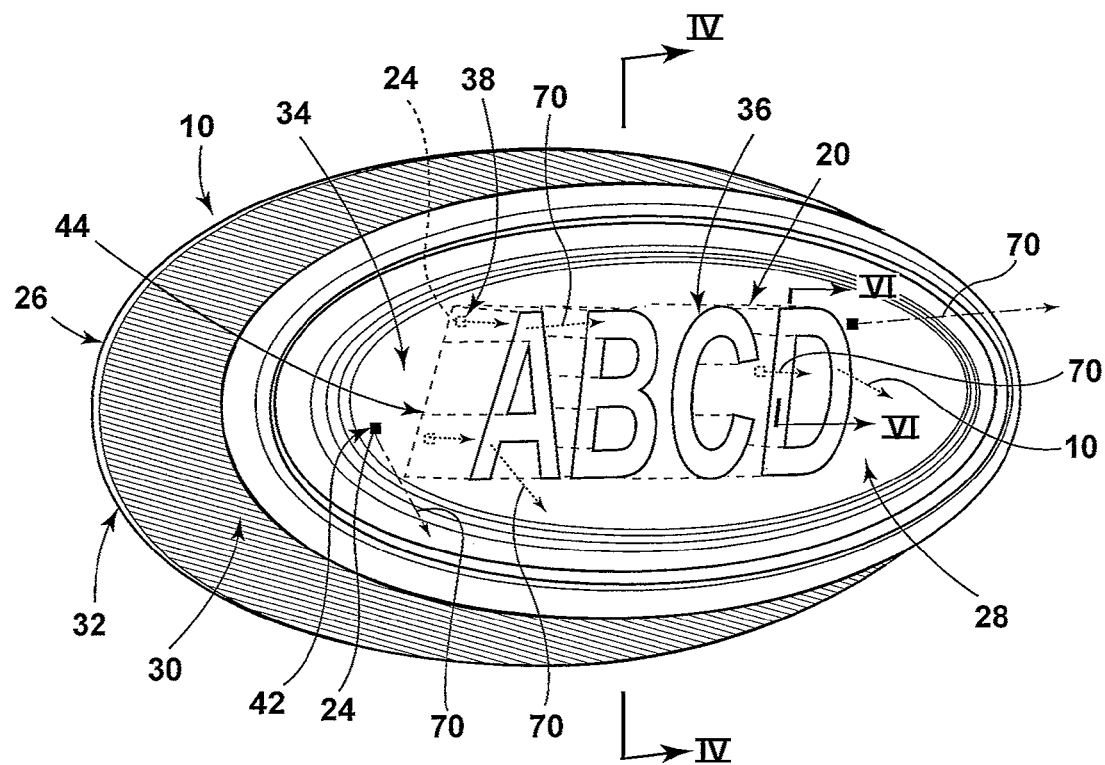
FIG. 2 is a front perspective view of the badge, according to one embodiment.

Referring to FIG. 2, the badge 10 is exemplarily shown, according to one embodiment, having a housing 26 that includes the viewable portion 20 centrally located on a forward portion 28 thereof, a peripheral portion 30, and a rear portion 32 that may be capable of being secured to the vehicle 14. The viewable portion 20 may be made of a transparent and/or translucent material that includes a background region 34 and indicia 36. The indicia 36 may signify the make, model, or any other information that may be desirable to confer about the vehicle 14 upon which the badge 10 is attached.

According to one embodiment, a first set 38 of light sources 24 is disposed within the badge 10. The badge 10 may also include a second set 42 of light sources 24 that may be configured to illuminate a portion of the badge 10. The first and second sets 38, 42 of light sources 24, and/or any additional light sources disposed within and/or on the badge 10, may include any form of light source. For example fluorescent lighting, light emitting diodes (LEDs), organic LEDs (OLEDs), polymer LEDs (PLEDs), solid state lighting, or any other form of lighting configured to emit light may be utilized. The one or more light sources 24 may be powered by a vehicle power supply 40 (FIG. 10) or any other power supply disposed onboard the vehicle 14. The first set of light sources 38 is disposed rearwardly of and orientated towards the viewable portion 20.

According to one embodiment, the first set 38 of light sources 24 is configured as a plurality of light sources 24 that emit light 70 through a first region, such as the indicia 36. The second set 42 light sources 24 is configured as a plurality of light sources 24 that emit light 70 through a second region of the viewable portion 20, such as the background region 34. The first and/or second set 38, 42 of light sources 24 may be configured to emit light 70 of varied intensities or wavelengths such that the viewable portion 20 may have perceived shaded regions. The first and/or second sets 38, 42 of light sources 24 may also each emit any desired color of light 70. According to one embodiment, each set 38, 42 of light sources 24 emits a different color of light 70 therefrom. For example, the first set 38 of light sources 24 may emit a neutral white light 70 and the second set 42 of light sources 24 may emit blue light 70. It will be appreciated, however, that the badge 10 may include any number of light sources 24, which may be disposed in any number of sets, that illuminate in any desired color without departing from the scope of the present disclosure.

The light 70 emitted from the first set 38 of light sources 24 may be directed through one or more light guides 44 towards pre-defined locations disposed proximately to the viewable portion 20 of the badge 10. Accordingly, the indicia 36 on the viewable portion 20, or the indicia 36 formed from the light guides 44, illuminate and/or emit light 70 therethrough. According to one embodiment, the indicia 36 may illuminate when the first set 38 of light sources 24 is illuminated and the background region 34 may illuminate when the second set 42 of light sources 24 is illuminated.

Each light source 24 within the badge 10 may be independently operated to emit light 70 towards a predefined location and/or desired region of the badge 10. For example, according to one embodiment, the first set 38 of light sources 24 includes about 80 independently controlled light sources 24. According to the same embodiment, the second set 42 of light source 24 includes about 100 independently controlled second set 42 of light sources 24. Additionally, a variable current may be supplied to each light source 24 to adjust the degree of illumination emitted from each light source 24. For example, the current may vary from 1 to 5 times the steady state current. Moreover, any light source 24 disposed within the badge 10 may illuminate in a plurality of colors, hues and/or intensities. The controller 46 may modify the intensity of the light 70 emitted from any light source 24 by pulse-width modulation or current control. In some embodiments, the controller 46 may be configured to adjust a color of the emitted light 70 by sending control signals to adjust an intensity or energy output level of any of the light sources 24. By adjusting the range of intensities that may be output from any light source 24, the second set 42 of light sources 24 within the badge 10 may confer any desired effect (e.g., a shaded appearance) through the viewable portion 20.

Figure 3:
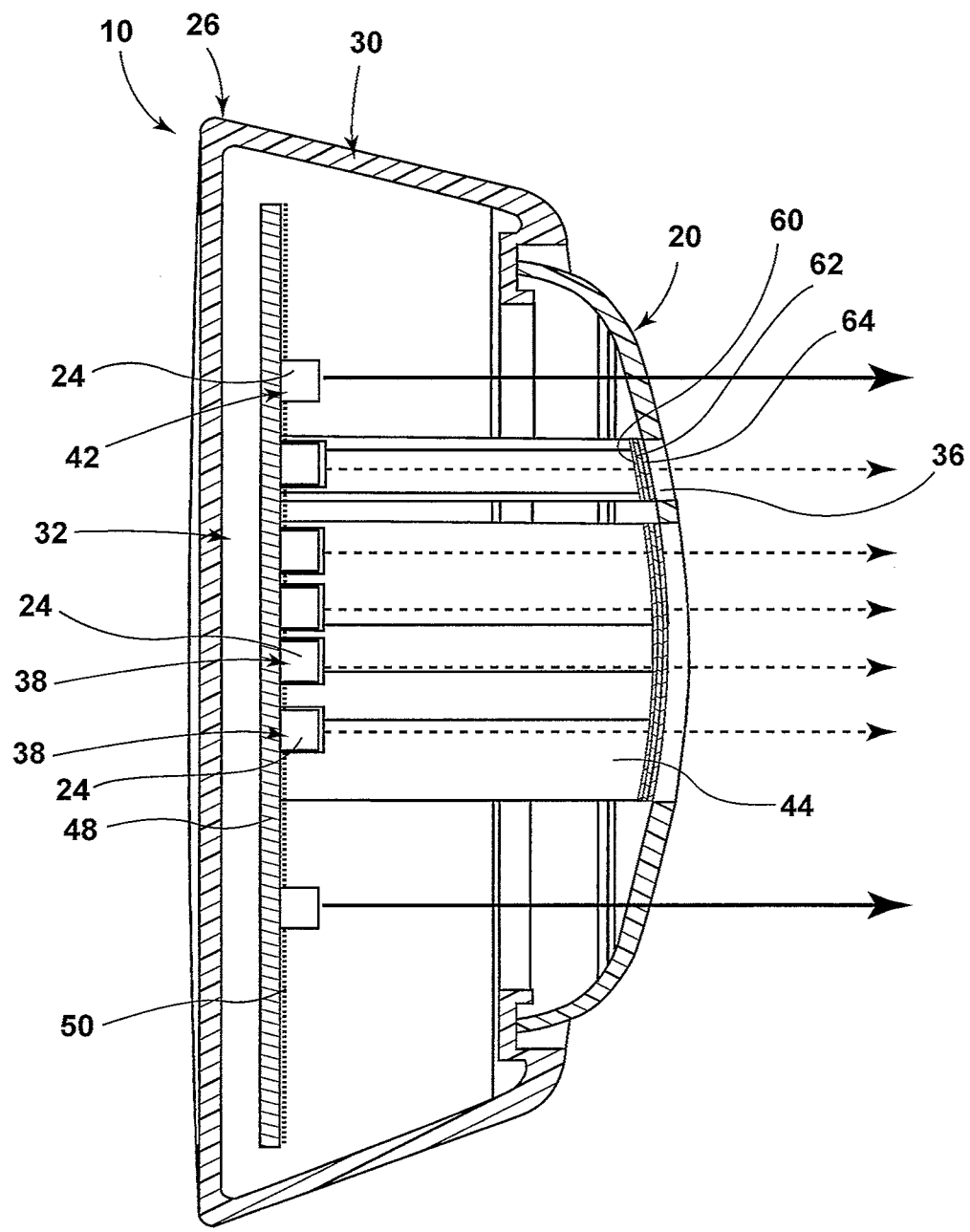
FIG. 3 is a cross-sectional view of the badge taken along lines of FIG. 1 having one or more light sources disposed within the badge, according to one embodiment.

Referring to FIG. 3, a cross-sectional view taken along the line of FIG. 1 illustrates one embodiment of the illuminated badge 10 wherein the viewable portion 20 may be arcuate whereas the rear portion 32 may be substantially linear. However, it should be appreciated that the badge 10, and portions thereof, may be configured in any desired and/or practicable shape. According to one embodiment, the housing 26 may be constructed from a rigid material such as, but not limited to, a polymeric material and portions thereof may be assembled together via sonic or laser welding. Alternatively, the viewable portion 20, the rear portion 32, and the peripheral portion 30 may be assembled together via low-pressure insert molding, or any other method known in the art, such as through the utilization of adhesives.

Portions of the housing 26 that are readily visible (e.g., the peripheral portion 30 and/or the viewable portion 20) may be colored any color or may be metalized to give any desired portion of the badge 10 a metallic appearance. For example, a metallic layer may be applied to the peripheral portion 30 via partial vacuum deposition. According to an alternate embodiment, the metallic layer may be applied to any portion of the housing 26 via electroplating a thin layer of chromium thereon. Alternatively still, an imitator of chrome may be used for aesthetic purposes. The metallic layer may include light permeable portions to allow light 70 to pass therethrough. Alternate processes may be used for coloring or layering material onto a portion of the housing 26, as known in the art without departing from the teachings provided herein.

The viewable portion 20 may also be colored any desired color and/or incorporate a metallized finish on portions thereof. According to one embodiment, the background region 34 employs a translucent blue color to partially conceal the components of the badge 10 disposed rearwardly of the viewable portion 20.

Referring still to FIG. 3, the first and/or second sets 38, 42 of light sources 24 may be provided on a flexible or rigid printed circuit board (PCB) 48 that is secured inside the housing 26. A first set 38 of light sources 24 may be disposed on the PCB 48 and positioned below the one or more light guides 44 to direct light 70 towards a desired location proximate the viewable portion 20. Optionally, the first and/or second sets 38, 42 of light sources 24 may include focusing optics to help concentrate light 70 in a desired direction. The PCB 48 may include a white solder mask 50 to reflect light 70 incident thereon. With respect to the embodiment shown in FIG. 3, a portion of the light 70 emitted from the light sources 24 may be transmitted through the viewable portion 20. Another portion of the light 70 may be emitted into the interior of the housing 26 and become incident on the white solder mask 50 of the PCB 48. As a result, the light 70 may be redirected back toward the viewable portion 20 and outputted from the housing 26.

Figure 4:
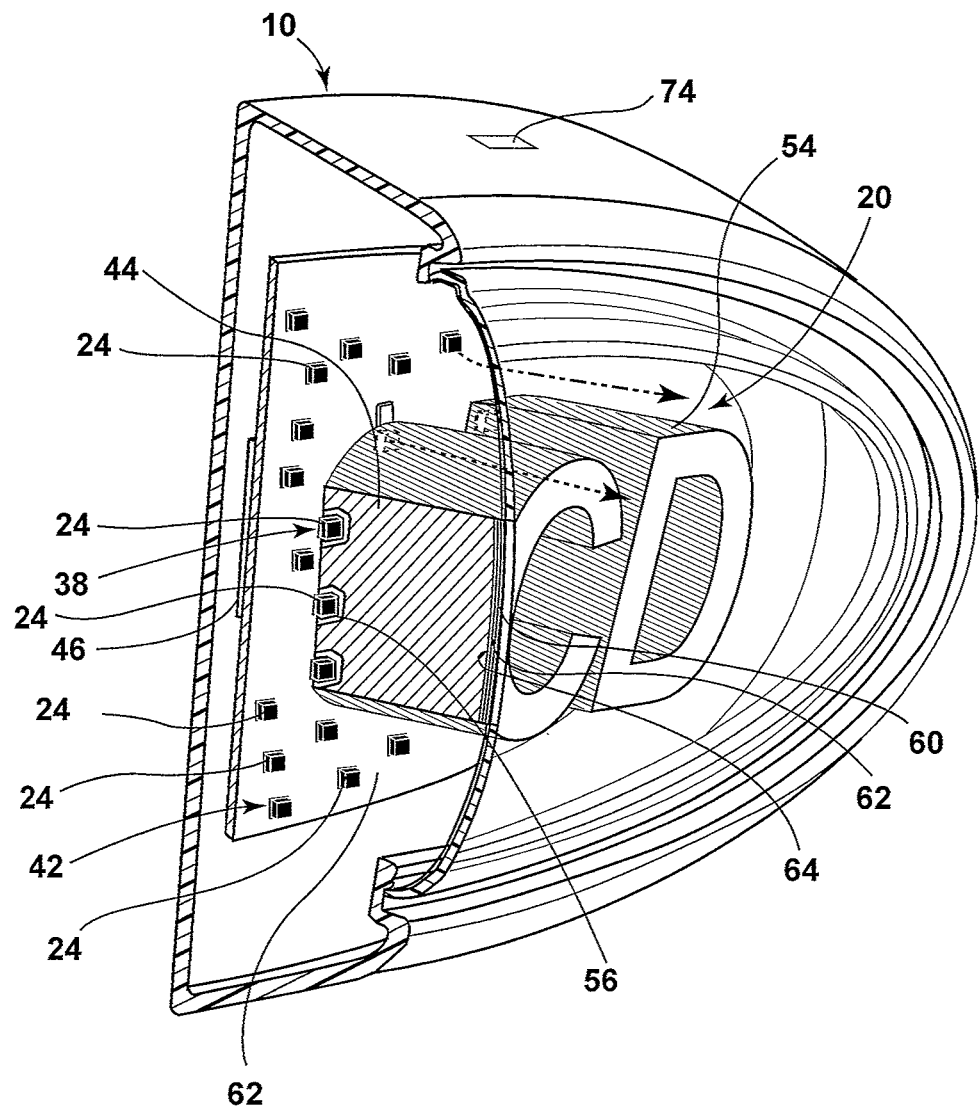
FIG. 4 is a perspective cross-sectional view of the badge taken along line IV-IV of FIG. 2 having a plurality of light sources configured to illuminate multiple portions of the badge, according to one embodiment.

Referring to FIG. 4, the controller 46 may be configured as an independent component that is disposed within and/or on the badge 10. With an independent controller 46, the badge 10 may independently function while relying on the power supply 40 of the vehicle 14. However, it should be appreciated that the badge 10 may incorporate an individual power supply as well. Moreover, the controller 46 may be disposed within the vehicle 14 and may be configured to control illumination of the badge 10 in conjunction with any other vehicle function.

As discussed above, the badge 10 includes the first set 38 of light sources 24 that may be operably coupled with one or more light guides 44. In some embodiments, the first set 38 of light sources 24 may be disposed below the corresponding one or more light guides 44. The second set 42 of light sources 24 may be dispersed randomly on the PCB 48. According to one embodiment, the second set 42 of light sources 24 are dispersed on the PCB 48 through a printing process. However, in alternate embodiments, the second set 42 of light sources 24 may be disposed in any desired manner in order to form any desired lighting effect from the badge 10.

In operation, each light source 24 may be activated using a variety of means. For example, the badge 10 may include a user interface 76 on the badge 10 and/or within the vehicle 14. The user interface 76 may be configured such that a user may control the wavelength of light 70 that is emitted from each light source 24. Additionally, or alternatively, the user interface 76 may be used to switch the badge 10 through a plurality of modes and/or functions. The user interface 76 may use any type of control known in the art for control the light source 24, such as, but not limited to, switches (e.g., proximity sensors, push-type buttons) and may be disposed in any practicable location. Additionally, or alternatively, the light source 24 may be automatically activated via an onboard vehicle system such as the vehicle security system and/or other vehicle system. For instance, sequential illumination may occur as part of a welcome or farewell sequence, meaning that the sequential illumination may occur as an occupant of the vehicle 14 leaves and/or approaches the vehicle 14 employing the illuminated badge 10. It is contemplated that the badge 10 may have a wide range of target locations such that the badge 10 may be used for a plurality of functions.

Since lighting conditions may vary depending on a plurality of factors including, but not limited to, the current time, date, and weather conditions, the controller 46 may adjust the intensity of any light source 24 such that illumination of the badge 10 may be noticed under any condition. For example, the light intensity in Florida during a clear summer afternoon will generally be higher than the light intensity in Michigan during an overcast winter morning. Thus, by making this type of information known to the controller 46, the controller 46 can adjust any light source 24 accordingly.

With further reference to FIG. 4, the light guides 44 may be made of a clear thermoplastic material, such as an acrylic material, or any other transparent and/or translucent material. The light guide 44 may be a substantially transparent or translucent guide suitable for transmitting light 70. The light guide 44 may be formed from a rigid material that is comprised of a curable substrate such as a polymerizable compound, a mold in clear (MIC) material and/or mixtures thereof. Acrylates are also commonly used for forming rigid light pipes, as well as poly methyl methacrylate (PMMA), which is a known substitute for glass. A polycarbonate material may also be used in an injection molding process to form the rigid light guide 44.

Further, the light guide 44 may be a flexible light guide, wherein a suitable flexible material is used to create the light guide 44. Such flexible materials include urethanes, silicone, thermoplastic polyurethane (TPU), or other like optical grade flexible materials. Whether the light guide 44 is flexible or rigid, the light guide 44, when formed, is substantially optically transparent and/or translucent and capable of transmitting light 70. The light guide 44 may be referred to as a light pipe, a light plate, a light bar or any other light carrying or transmitting substrate made from a clear or substantially translucent material. An opaque material 54 may be disposed on any of the exterior surfaces of the one or more light guides 44 to further direct the light 70 along the light guide 44.

The light guide 44 may extend from the viewable portion 20 to the PCB 48. It should be appreciated that the light guide 44 may be held in place through any means known in the art. For example, the light guide 44 may include locators that correspond to locator apertures defined by the PCB 48. Additionally, and/or alternatively, the light guide 44 may be compressively, adhesively, fastened, or otherwise disposed between the viewable portion 20 and the PCB 48.

Figure 5:
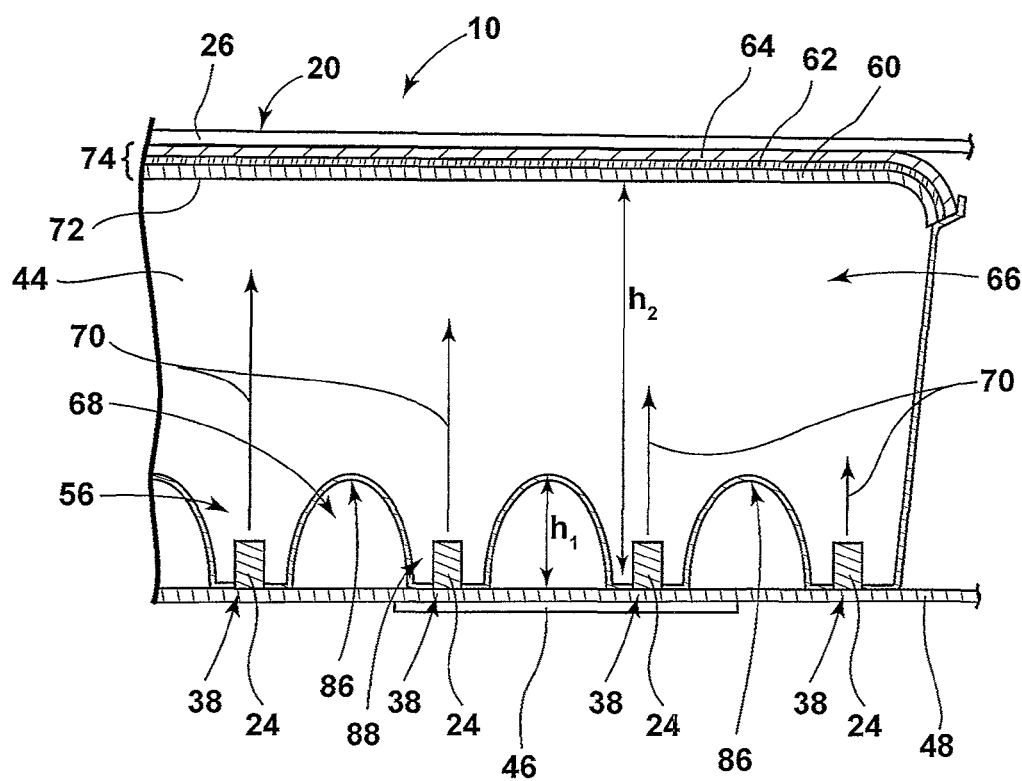
FIG. 5 is a cross-sectional view of indicia disposed within the badge taken along line VI-VI of FIG. 2, according to one embodiment.

Referring to FIG. 5, a single light guide 44 extends over multiple light sources 24 within the first set 38 of light sources 24 and includes an upper, body portion 66 and the bottom portion 56 that defines one or more of cavities 68. The bottom portion 56 of the light guide 44 may also define light source openings 52 that encompass, encapsulate, and/or otherwise operably, or optically, couple with an individually controlled light source 24 within the first set 38 of light sources 24. A top portion 86 of each cavity 68 is disposed above the first set 38 of light source(s) 24.

As each light source 24 within the first set 38 is illuminated, a proximal portion 88 of the light guide 44 that encompass each respective first light source 24 direct light towards the viewable portion 20. As the first set 38 of light sources 24 are subsequently illuminated, the indicia 36 disposed proximately to the upper surface 72 of the light guide 44 will sequentially illuminate. The sequential illumination may confer an appearance as if the indicia 36 are being written by hand as each letter sequentially becomes illuminated.

Moreover, the thickness of the body portion 66 may be varied to affect the blending characteristics thereof. For example, a thinner body portion 66 may create brighter, distinct points forwardly of the plurality of light guide 44. Alternatively, a thicker body portion 66 may lead to smaller defined bright spots and more uniform blending as each light source 24 within the first set 38 is illuminated, and in some instances, sequentially illuminated. It will be appreciated that the thickness of the body portion 66 may also be varied along the length thereof such that the body portion 66 has varied blending characteristics therealong. In some embodiments, the cavities 68 of the light guide 44 may have a height $h_1$ that is less than one-half of a height $h_2$ of the light guide 44.

The diffusive layer 60 may be adhered to the decorative layer 64 through the usage of an adhesive layer 62 to form an indicia layer 74. The diffusive layer 60 may be configured as a one or two side diffuser film that is designed to break up and distribute light 70 evenly so that hot spots and shadows may be eliminated. The diffusive layer 60 may have any desired light transparency and haze. For example, the diffusive layer 60 may have a light transparency between 30% and 95% and a haze that may be above 70%, particularly above 75%, and more particularly 80% or above.

The diffusive layer 60 may be adhered to the decorative layer 64 through an adhesive layer 62. The adhesive layer 62 may be an optically clear adhesive. As used herein, the term "optically clear" refers to an adhesive that has a high light transmittance over at least a portion of the visible light spectrum (about 400 to about 700 nanometers), and that exhibits low haze. Both the luminous transmission and the haze can be determined using, for example, the method of ASTM-D 1003-95. In one embodiment, the adhesive has about 10% haze or less, particularly about 5% haze or less, and more particularly about 2% haze or less.

A wide variety of adhesives are suitable for forming the adhesive layer 62, for example, heat activated adhesive, pressure sensitive adhesives, any other practicable adhesive, and/or a combination thereof. In one embodiment, the thickness of the adhesive layer 62 is at least about 1 micron, at least about 5 microns, at least about 10 microns, at least about 15 microns, or at least 20 microns. In some embodiments, the thickness is often no greater than about 500 microns, no greater than about 300 microns, no greater than about 150 microns, or no greater than about 125 microns.

The decorative layer 64 may also be configured as a film in some embodiments. The decorative layer 64 may include a polymeric material or any other suitable material and is configured to control or modify an appearance of the upper surface 72 of the light guide 44. For example, the decorative layer 64 may be configured to confer a metallic appearance. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein. In other embodiments, the decorative layer 64 may be tinted any color to complement the vehicle component on which the badge 10 is to be received.

According to one embodiment, the decorative layer 64 and the diffusive layer 60 are both configured as films that may be stamped, or otherwise cut, to substantially match the geometry of the indicia 36 and/or a top surface of the light guide 44. In some embodiments, the light guide 44 is insert molded on to the diffusive layer 60 after the indicia layer 74 is hot or cold stamped into a desired geometry. It will be appreciated, however, that any processes known in the art for forming the decorative layer 64, the diffusive layer 60, and/or any other indicia layer 74 may be utilized without departing from the scope of the present disclosure.

The controller 46 may have corrective algorithms that permit precise adjustment of the light sources 24 to compensate for color shifts, etc., over time. Furthermore, when sequentially illuminating the first set 38 of light sources 24 within the badge 10, specific algorithms can be implemented to effect a smooth transition, which is not necessarily a linear adjustment of each respective color. Thus, to adjust from 0% brightness to 100% brightness, a linear adjustment might introduce an undesirable effect in the transition. Thus, in one embodiment, specific look-up tables (LUTs) can be provided that are used by the controlling processor 78 (FIG. 6) and/or controllers 46 containing the necessary brightness values for properly adjusting during the transition. The control may be affected using software algorithms specifically designed for creating desired patterns and controlling the transitions thereof.

Figure 6:
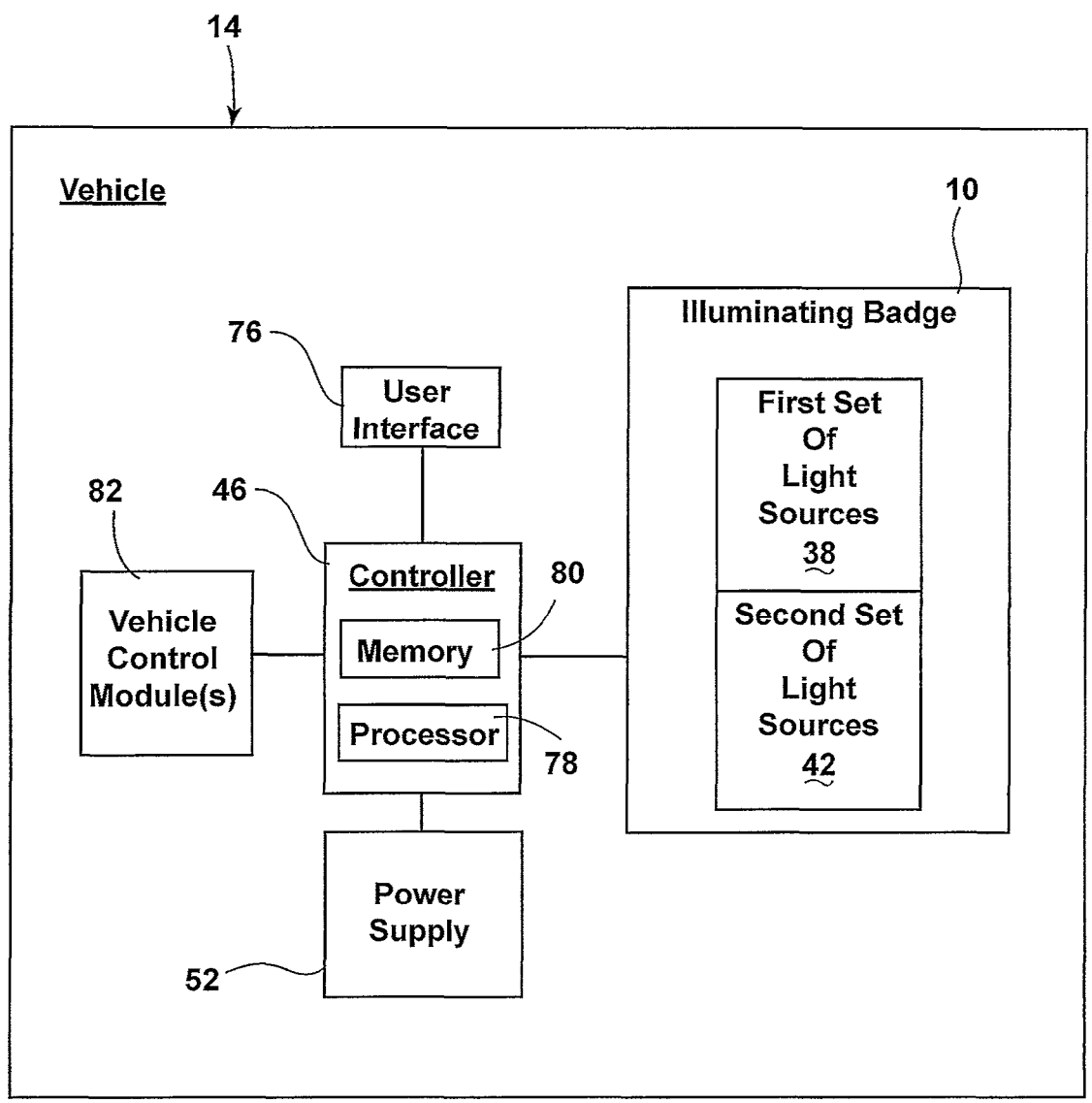
FIG. 6 is a block diagram of the vehicle and the badge, according to one embodiment.

Referring to FIG. 6, a box diagram of a vehicle 14 is shown in which an illuminated badge 10 is implemented. The badge 10 includes a controller 46 in communication with the first and second sets 38, 42 of light sources 24. The controller 46 may include memory 80 having instructions contained therein that are executed by a processor 78 of the controller 46. The controller 46 provides electrical power to any light source 24 via the power supply 40 located onboard the vehicle 14 and/or within the badge 10. In addition, the controller 46 may be configured to control the light 70 output of each light source 24 independently based on feedback received from one or more vehicle control modules 82 such as, but not limited to, a body control module, engine control module, steering control module, brake control module, the like, or a combination thereof. By controlling the light 70 output by each set 38, 42 of light sources 24 independently, the badge 10 may illuminate in a variety of colors and/or patterns to provide an aesthetic appearance, such as a written script appearance, or may provide vehicle information to an intended observer. For example, the illumination provided by the badge 10 may be used for numerous vehicle applications, such as, but not limited to, an aesthetic feature, a car finding feature, a remote start indicator, a door lock indicator, a door ajar indicator, a running light, etc.

In operation, the badge 10 may exhibit a constant unicolor or multicolor illumination. For example, the controller 46 may prompt a first light source 24 within the badge 10 to illuminate in a first color thereby illuminating indicia 36 disposed on the badge 10. Simultaneously, a second light source 24 may illuminate in a second color to illuminate a background region 34 of the viewable portion 20. As discussed above, each light source 24 may be independently illuminated by the controller 46 such that the viewable portion 20 may illuminate in a plurality of predefined patterns.

The controller 46 that controls the sequential illumination of the first set 38 of light sources 24 can be any circuit suitable for the purposes described herein. According to one embodiment, the controller 46 delays 75 milliseconds between illumination of each respective light source 24. This sequence repeats by lighting the adjacently disposed light sources 24 until each light source 24 within the first set 38 of light sources 24 is illuminated. According to one embodiment, the time period of the sequence until the final light source 24 is illuminated may be 3 seconds. All, or some, of the first set 38 of light sources 24 may maintain an illuminated state for a predefined time, such as 5 seconds, giving the time of the sequence to be 8 seconds. The sequence may be then repeated. It should be understood that the time values given herein are for exemplary purposes by way of a non-limiting example.

According to one embodiment, the badge 10 may include a first set 38 of light sources 24 that sequentially illuminate such that indicia 36 on the viewable portion 20 is progressively illuminated. The controller 46 may also illuminate the first set 38 or second set 42 of light sources 24 independently. For example, the controller 46 may prompt the first set 38 of light sources 24 to sequentially illuminate indicia 36 disposed on the viewable portion 20 of the badge 10. Alternatively, the controller 46 may prompt a second set 42 of light sources 24 to emit varied intensities of light 70 such that the background region 34 of the viewable portion 20 appears shaded. The controller 46 may illuminate each light source 24 in a unique color, or any of the light sources 24 may emit light 70 of a common wavelength.

The badge 10 may also include a user interface 76. The user interface 76 may be configured such that a user may control the wavelength of light 70 that is emitted by each light source 24. Such a configuration may allow a user to control which components of the badge 10 and/or features thereof are illuminated.

With respect to the above examples, the controller 46 may modify the intensity of the light 70 emitted from any of the light sources 24 by pulse-width modulation or current control. In some embodiments, the controller 46 may be configured to adjust a color of the emitted light 70 by sending control signals to adjust an intensity or energy output level of any of the light sources 24. By adjusting the range of intensities that may be output from any light source 24, the first and/or second sets 38, 42 of light sources 24 may be operable to generate a range of color hues of the emitted light 70. Additionally, varying the range of intensities of any of the light sources 24 may accentuate any appearance features (e.g., shaded appearance) of the badge 10.

Accordingly, an illuminating badge for a vehicle has been advantageously described herein. The badge provides various benefits including an efficient and cost-effective means to produce illumination that may function as a distinct styling element that increases the refinement of a vehicle, or any other product that may have a badge disposed thereon.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle badge, comprising:
   a housing of said badge defining a viewable portion having indicia;
   a first set of light sources configured to emit light toward the viewable portion;
   a light guide extending between the viewable portion and the first set of light sources;
   a decorative layer and a diffusive layer disposed between an upper surface of the light guide and viewable portion; and
   a second set of light sources configured to emit light without the light guide toward the viewable portion, wherein the first set of light sources illuminates a first region of the viewable portion and the second set of light sources illuminates a second region of the viewable portion.

2. The badge of claim 1, wherein the first set of light sources are disposed below the indicia and configured to emit light through the indicia when illuminated.

3. The badge of claim 2, wherein the light guide extends between the first set of light sources and the indicia.

4. The badge of claim 1, wherein a bottom portion of the light guide is disposed proximately to a top surface of a printed circuit board such that the light guide and printed circuit board define a plurality of cavities.

5. The badge of claim 4, further comprising:
   a first light source opening disposed on a first side of one of the plurality of cavities and a second light source opening disposed on a second side of the one of the plurality of cavities.

6. The badge of claim 5, wherein a controller is configured to illuminate a first light source prior to illumination of a second light source, the first and second light sources each disposed within the first set of light sources.

7. The badge of claim 6, wherein the first and second light sources are disposed in the first set of light sources.

8. A vehicle badge, comprising:
   a housing of said badge having a viewable portion;
   a first light source configured to illuminate a first portion of the viewable portion;
   a light guide disposed between the first light source and the viewable portion;

a second light source configured to illuminate without the light guide a second portion of the viewable portion; and a diffusive layer and a decorative layer disposed between the light guide and the viewable portion.

9. The badge of claim 8, wherein the first light source is configured as a plurality of independently controlled LED sources and the second set of light sources are configured as a plurality of independently controlled LED light sources.

10. The badge of claim 8, wherein the light guide includes an opaque material on an outer surface thereof to prevent light emitted from the second light source from entering the light guide.

11. The badge of claim 8, further comprising:

an optically clear adhesive layer disposed between the diffusive layer and the decorative layer.

12. The badge of claim 9, wherein the first light source illuminates in a substantially white color and wherein the second light source illuminates in a non-white color.

13. A method of forming a vehicle badge, comprising:

forming a housing of said badge;

disposing a light source within the housing, the light source configured to direct light towards a viewable portion;

disposing a light guide between the light source and viewable portion;

disposing a second set of light sources within the housing, the second set of light sources configured to illuminate without the light guide a background region of the viewable portion; and forming an indicia layer defining one or more indicia by adhering a diffusive layer to a decorative layer, the indicia layer disposed between the viewable portion and light guide.

14. The method of forming a badge of claim 13, wherein the indicia layer includes an adhesive layer disposed between the diffusive layer and decorative layer.

15. The method of forming a badge of claim 13, wherein the light source is configured as a set of independently illuminable light sources.

16. The method of forming a badge of claim 15, further comprising the step of:

sequentially illuminating an adjacently disposed first set of light sources until each first light source is illuminated.

17. The method of forming a badge of claim 13, wherein the second set of light sources emit varying hues of a color of light while the first set of light sources sequentially illuminate the indicia disposed on the viewable portion.

18. The method of forming a badge of claim 13, wherein the indicia layer is cut into a predefined geometry that coincides to a top surface of the light guide to define indicia through the viewable portion.

* * * * *